(12) United States Patent
Chen et al.

(10) Patent No.: US 10,634,780 B2
(45) Date of Patent: Apr. 28, 2020

(54) ELECTROMAGNETIC WAVE IMAGING SYSTEM AND ANTENNA ARRAY SIGNAL CORRECTION METHOD

(71) Applicants: Nuctech Company Limited, Beijing (CN); Tsinghua University, Beijing (CN)

(72) Inventors: Zhiqiang Chen, Beijing (CN); Yuanjing Li, Beijing (CN); Ziran Zhao, Beijing (CN); Wanlong Wu, Beijing (CN); Zongjun Shen, Beijing (CN); Yinong Liu, Beijing (CN); Jieqing Yang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 102 days.

(21) Appl. No.: 15/563,187

(22) PCT Filed: Jul. 21, 2016

(86) PCT No.: PCT/CN2016/090807
§ 371 (c)(1),
(2) Date: Sep. 29, 2017

(87) PCT Pub. No.: WO2017/012561
PCT Pub. Date: Jan. 26, 2017

(65) Prior Publication Data
US 2018/0120430 A1 May 3, 2018

(30) Foreign Application Priority Data

Jul. 23, 2015 (CN) .......................... 2015 1 0437014

(51) Int. Cl.
*G01S 13/90* (2006.01)
*G01S 17/08* (2006.01)
(Continued)

(52) U.S. Cl.
CPC .............. *G01S 13/90* (2013.01); *G01S 15/08* (2013.01); *G01S 17/08* (2013.01); *G01S 13/08* (2013.01)

(58) Field of Classification Search
CPC .......... G01S 13/08; G01S 13/90; G01S 17/89; G01S 15/08; G01S 17/08
See application file for complete search history.

(56) References Cited

U.S. PATENT DOCUMENTS 6,251,073 B1 * 6/2001 Imran ...................... A61B 8/08
600/443
2012/0262324 A1 * 10/2012 Samaniego ........... G01S 13/885
342/22
(Continued)

FOREIGN PATENT DOCUMENTS

CN 101261319 A 9/2008
CN 101515036 A 8/2009
(Continued)

OTHER PUBLICATIONS

"International Application No. PCT/CN2016/090807, International Search Report dated Oct. 25, 2016", w/ English Translation, (dated Oct. 25, 2016), 5 pgs.
(Continued)

*Primary Examiner* — Olumide Ajibade Akonai
(74) *Attorney, Agent, or Firm* — Schwegman Lundberg & Woessner, P.A.

(57) ABSTRACT

An electromagnetic wave imaging system and a method of correcting an antenna array signal are disclosed. In an example, the electromagnetic wave imaging system may include an antenna array, configured to receive electromagnetic wave from a target object and convert the electromagnetic wave into an electrical signal; a signal processing unit, configured to process the electrical signal to obtain an image of the target object; and a distance measuring device,
(Continued)

configured to measure a distance of the target object from the antenna array, wherein the signal processing unit corrects the electrical signal based at least in part on the measured distance.

15 Claims, 2 Drawing Sheets

(51) Int. Cl.
*G01S 15/08* (2006.01)
*G01S 13/08* (2006.01)

(56) References Cited

U.S. PATENT DOCUMENTS

| 2013/0176167 A1* | 7/2013 | Bergeron | G01S 13/9005 342/25 F |
| 2013/0338506 A1* | 12/2013 | Kim | G01S 7/52095 600/447 |
| 2016/0124091 A1* | 5/2016 | Kawahito | G01S 17/89 356/5.01 |

FOREIGN PATENT DOCUMENTS

| CN | 103018739 A | 4/2013 |
| EP | 1798570 A2 | 6/2007 |
| GB | 2436454 A | 9/2007 |
| JP | 1183996 A | 3/1999 |
| JP | 2005004391 A | 1/2005 |

OTHER PUBLICATIONS

"International Application No. PCT/CN2016/090807, Written Opinion dated Oct. 25, 2016", (dated Oct. 25, 2016), 3 pgs.

"European Application Serial No. 16 827 252.4, Extended European Search Report dated Dec. 20, 2018", (dated Dec. 20, 2018), 9 pgs.

* cited by examiner

ELECTROMAGNETIC WAVE IMAGING SYSTEM AND ANTENNA ARRAY SIGNAL CORRECTION METHOD

CROSS-REFERENCE TO RELATED APPLICATION(S)

This application is a U.S. National Stage Filing under 35 U.S.C. 371 from International Application No. PCT/CN2016/090807, filed on Jul. 21, 2016, and published as WO2017/012561 on Jan. 26, 2017, which claims priority to a Chinese application No. 201510437014.4, filed on Jul. 23, 2015, entitled "ELECTROMAGNETIC WAVE IMAGING SYSTEM AND ANTENNA ARRAY SIGNAL CORRECTION METHOD"; which applications and publication are incorporated herein by reference in their entirety.

TECHNICAL FIELD

The present disclosure relates to the field of electromagnetic wave imaging technology, and in particular to an electromagnetic wave imaging system capable of adjusting a focal length in real time and an antenna array signal correction method.

BACKGROUND

Currently, passive synthetic aperture electromagnetic wave imaging technology has been widely used in the fields of radio astronomy, earth remote sensing and detection etc. Its frequency band covers entire microwave, millimeter wave and terahertz bands, and can continue to expand to electromagnetic wave with a higher frequency band as development of the technology. An imaging principle thereof is described as follows.

In particular, a plurality of receive antennas are arranged in a plane in space to form an antenna array. Such a plane is referred to as an antenna plane. Signals received by an i-th antenna and a j-th antenna in the antenna array are complex correlated to obtain a visibility value $V_{ij}$. Assuming that the number of the receive antennas is N, N(N−1) visibility values may be obtained. In fact, depending on the arrangement of the receive antennas, there is redundancy in the N(N−1) visibility values, and a part of redundant visibility values may not be calculated. According to a passive synthetic aperture electromagnetic wave imaging algorithm, an angle distribution of electromagnetic wave emitted toward the antenna plane may be calculated.

When a target object is far enough away from the antenna plane (i.e., a size of the antenna array is less than, for example, one percent of a distance of the target object to the antenna plane, the size of the antenna array may be represented by a distance between two antennas which are spaced by a maximum distance), It can be considered that the angular distribution is a spatial distribution of intensity of the electromagnetic wave emitted around by the target object. Traditional fields to which passive synthetic aperture electromagnetic wave imaging technology is applied, such as the radio astronomy, earth remote sensing and detection etc. meet such a condition.

The visibility value required for the passive synthetic aperture electromagnetic wave imaging algorithm should be calculated by electromagnetic wave signals going through the antenna receive surface on the antenna plane. But actually, the visibility value may be obtained only after the received electromagnetic wave is transmitted and processed by the antennas and subsequent circuits, and gains of the respective antennas and the subsequent circuits are also different. Thus, it is required to correct the visibility value. In addition, it is required to correct the visibility value either, if a short-range (i.e., for example, the size of the antenna array is more than e.g. one percent of the distance from the target object to the antenna plane) target object needs to be imaged.

A feasible correction method is described below. In particular, $V_{ij}$ is used to $V'_{ij}$ represent an actually measured visibility value, i.e., a visibility value before correction, and is used to represent a visibility value required for the passive synthetic aperture electromagnetic wave imaging algorithm, i.e., a visibility value after correction. Assuming that a target object which is spaced from the antenna plane by L needs to be imaged, a point-like electromagnetic wave source may be placed at a position on an axis of the antenna array which is spaced from the antenna plane by L. The visibility value $V_{ij}$ of the i-th antenna and the j-th antenna may be measured, and a correction factor $C_{ij}=V_{ij}$. When imaging measurement is performed on the target object, $V'_{ij}=V_{ij}/C_{ij}$. Then, $V'_{ij}$ is substituted into the passive synthetic aperture electromagnetic wave imaging algorithm to obtain a clear image of the target object which is near the axis of the antenna array and is spaced from the antenna plane by L. L is referred to as a focal length of the system.

However, the passive synthetic aperture electromagnetic wave imaging system using the above correction method can only clearly image the target object which is spaced from the antenna plane by L. When the distance between the target object and the antenna plane deviates from L, the image of the target object becomes blurred rapidly. Re-correction is thus necessary to change the focal length of the system to a desired value, in order to image an object at other distances. This causes it very inconvenient to use the passive synthetic aperture electromagnetic imaging system in imaging a short-range target, and even not possible to use the passive synthetic aperture electromagnetic imaging system in imaging a moving target.

SUMMARY

Objects of the present disclosure at least partly consist in providing an electromagnetic wave imaging system and an antenna array signal correction method.

According to an aspect of the present disclosure, an electromagnetic wave imaging system is provided, which includes: an antenna array, configured to receive electromagnetic wave from a target object and convert the electromagnetic wave into an electrical signal; a signal processing unit, configured to process the electrical signal to obtain an image of the target object; and a distance measuring device, configured to measure a distance of the target object from the antenna array, wherein the signal processing unit corrects the electrical signal based at least in part on the measured distance.

According to an embodiment, the electromagnetic wave imaging system may further include: a storage unit, configured to store a correction factor at a calibration point for a visibility value between every two antennas in the antenna array, wherein the signal processing unit configured to obtain, for the every two antennas, a correction factor for correcting the electrical signal from the stored correction factors, based on a difference between the distances of the calibration point from the two antennas and a difference between the distance of the target object from the two antennas.

In an example, assuming that for any two antennas i and j in the antenna array, a difference between a distance of the calibration point A from the antenna i and a distance of the calibration point A from the antenna j is $\Delta^A_{ij}$, a difference between a distance of the target object B from the antenna i and a distance of the target object B from the antenna j is $\Delta^B_{ij}$, and the stored correction factor for the antennas i and j is $V^N_{ij}$, the resulting correction factor for the antennas i and j is:

$$V^B_{ij} = V^A_{ij} * e^{\frac{2\pi J(\Delta^B_{ij} - \Delta^A_{ij})}{\lambda}} * P_{ij}$$

wherein J is a unit of imaginary number, i.e., $J^2 = -1$, $\lambda$ is a wavelength of electromagnetic wave, and $P_{ij}$ is correction on a signal power. For example, $P_{ij} = 1$.

According to an embodiment, the electromagnetic wave imaging system may further include: a storage unit, configured to store correction factors at a series of calibration points for a visibility value between every two antennas in the antenna array, wherein the signal processing unit selects correction factors corresponding to one or more of the series of calibration points as correction factor for correcting the electrical signal, based on the distance of the target object from the antenna array measured by the distance measuring device.

In an example, the correction factor corresponding to a calibration point whose distance from the target object is less than a certain threshold may be selected as the correction factor for correcting the electrical signal. For example, a correction factor corresponding to a calibration point whose distance from the target object is minimum may be selected as the correction factor for correcting the electrical signal. When the correction factors corresponding to a plurality of calibration points are selected, an interpolation value of these correction factors may be used as the correction factor for correcting the electrical signal.

According to an embodiment, the signal processing unit corrects the visibility value $V_{ij}$ of the antennas i and j obtained based on the electric signal from the signal processing unit by a formula: $V'_{ij} = V_{ij}/V^C_{ij}$, where $V^C_{ij}$ is the determined correction factor for correcting the electrical signal, and the corrected visibility value $V'_{ij}$ is used for imaging.

According to another aspect of the present disclosure, a method of correcting an electrical signal from an antenna array is provided, wherein the antenna array receives electromagnetic wave from a target object, and the received electromagnetic wave is converted into an electrical signal. The method includes: measuring a distance of the target object from the antenna array; and correcting the electrical signal based at least in part on the measured distance.

According to an embodiment, the correcting the electrical signal may include: obtaining, for every two antennas in the antenna array, a correction factor for correcting the electrical signal from the correction factor for a visibility value between the two antennas which is obtained in advance by using a calibration point, based on a difference between the distances of the calibration point from the two antennas and a difference between the distances of the target object from the two antennas.

According to another embodiment, the correcting the electrical signal may include: obtaining correction factors for a visibility value between every two antennas in the antenna array in advance by using a series of calibration points; and selecting correction factors corresponding to one or more of the series of calibration points as correction factor for correcting the electrical signal, based on the distance of the target object from the antenna array.

The electromagnetic wave imaging system according to the embodiments of the present disclosure will be able to adjust the focal length in real time, and thus the moving object may be kept being imaged clearly.

BRIEF DESCRIPTION OF THE DRAWINGS

In order to better understand the present disclosure, embodiments of the present disclosure will be described according to the accompanying drawings, in which.

DETAILED DESCRIPTION

Figure 1:
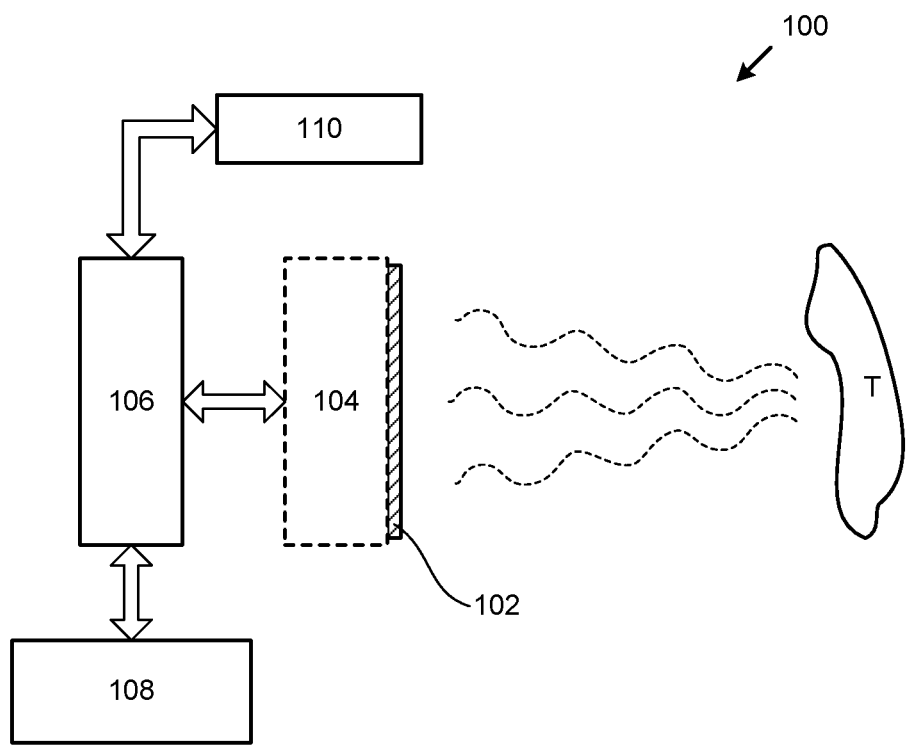
FIG. 1 shows a schematic structure diagram of an electromagnetic wave imaging system according to an embodiment of the present disclosure.

Hereinafter, embodiments of the present disclosure will be described with reference to the accompanying drawings. It is to be understood that such description is exemplary only but is not intended to limit the scope of the present disclosure. In addition, in the following description, descriptions of well-known structures and techniques are omitted to avoid unnecessarily obscuring the concepts of the present disclosure.

The terms used herein is for the purpose of describing particular embodiments only, but is not intended to limit the present disclosure. The words "a", "an" and "the" as used herein should also cover the meanings of "a plurality of", "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present specification and should not be interpreted in an idealized or overly stereotyped manner.

Some block diagrams and/or flowcharts are shown in the accompanying drawings. It should be understood that some of blocks or combinations thereof in the block diagrams and/or flowcharts may be implemented by computer program instructions. The computer program instructions may be provided to a general purpose computer, a dedicated computer, or processors of other programmable data processing devices, so that the instructions, when being executed by the processor, may create means for implementing the functions/operations as described in the block diagrams and/or flowcharts.

Thus, the techniques of the present disclosure may be implemented in forms of hardware and/or software (including firmware, microcode, etc.). In addition, the techniques of the present disclosure may be embodied in a form of a computer program product on a computer readable medium storing instructions. The computer program product may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

FIG. 1 shows a schematic structure diagram of an electromagnetic wave imaging system according to an embodiment of the present disclosure.

As shown in FIG. 1, the electromagnetic wave imaging system 100 according to the present embodiment includes an antenna array 102, a signal processing unit 106 and a distance measuring device 110. In addition, FIG. 1 also shows a target object T.

The antenna array 102 includes a plurality of antennas arranged in a plane, which may be referred to as an antenna plane. Generally, the antennas may be arranged in rows and columns. Of course, the antennas may be arranged in other forms. In a passive system, the antennas may not transmit signals, but receive electromagnetic radiation or electromagnetic wave (as shown in FIG. 1 in dotted lines) from the target object T.

When the antennas receive the electromagnetic wave, electrical signals may be generated, e.g., due to resonance. The electrical signals generated by the respective antennas in the antenna array 102 reflect a distribution of the electromagnetic wave from the target object T on the antenna plane. According to an embodiment of the present disclosure, the system 100 may further include an antenna signal processing unit 104 for converting the antenna signal into data suitable to be processed. Such an antenna signal processing unit 104 may include a plurality of conversion circuits each corresponding to each of the antennas in the antenna array 102. The conversion circuits may be integrated with the respective antennas, so that the antenna signal processing unit 104 is built in the antenna array 102. Alternatively, the antenna signal processing unit 104 may be disposed separately from the antenna array 102, electrically connected to each other (e.g., via a cable).

The antenna signal processing unit 104 cooperates with the antenna array 102 to obtain data that can be easily processed. In the present disclosure, the antenna array 102 and the antenna signal processing unit 104 function together for receiving the electromagnetic wave and converting the electromagnetic wave into the electrical signals. That is, in the context of the present disclosure, the term "antenna array" refers to a module that receives the electromagnetic wave and converts the electromagnetic wave into the electrical signals suitable to be processed. There are a variety of such antenna arrays in the art.

The signal processing unit 106 may process the converted electrical signal. For example, the signal processing unit 106 may process the electrical signal according to an imaging algorithm, and thereby obtain an image of the target object T. There are a variety of imaging algorithms in the art, and thus will not be described in detail here. The signal processing unit 106 may be implemented as various computing devices, such as personal computers (PCs), workstations, servers, etc., and may receive the electrical signals from the antenna array or the antenna signal processing unit e.g., via a wired connection such as a cable or via a wireless connection. The image obtained by the signal processing unit 106 may be output by an output unit 108. The output unit 108 may include a display, a printer, etc. Alternatively, the image may be stored in a storage unit (not shown), and may be sent to other devices via the wired and/or wireless connection.

The distance measuring device 110 may measure a distance of the target object T from the antenna array 102 (particularly, a certain antenna in the antenna plane or in the antenna array) (in real time), and provide (real time) location information of the measured target object to the signal processing unit 106. The distance measuring device 110 may provide information that explicitly indicates the distance of the target object T from the antenna array 102, or may provide information that implicitly indicates the distance of the target object T from the antenna array 102 (i.e., the distance of the target object T from the antenna array 102 may be obtained according to the information). For example, the distance measuring device 110 may include one or more range finders arranged on the antenna array 102 (e.g., may be arranged on the antenna plane), such as a laser range finder, an ultrasonic range finder, and the like.

It should be noted here that the distance measuring device 110 is not limited to being arranged on the antenna array 102, and may also be arranged separately from the antenna array 102. The distance of the target object T from the antenna array 102 may be derived from the measurement result of the distance measuring device 110, based on a relative position of the distance measuring device 110 with respect to the antenna array 102.

As described in the Background section, it is necessary to correct the electrical signal and then to image with the corrected electrical signal when the imaging, especially the short-range imaging, is performed. In the technique of the present disclosure, the signal processing unit corrects the electrical signal based at least in part on the distance of the target object T from the antenna array 102 which is measured by the distance measuring device 110.

For example, a correction factor for a visibility value between every two antennas in the antenna array may be obtained in advance by using a calibration point. These correction factors obtained in advance may be stored in a storage unit (not shown). For every two antennas, the signal processing unit 106 may obtain a correction factor for correcting the electrical signal from the stored correction factors based on a difference between the distances of the calibration point from the two antennas and a difference between of the distance of the target object from the two antennas.

In another example, correction factors for a visibility value between every two antennas in the antenna array may be obtained in advance by using a series of calibration points. These correction factors obtained in advance may be stored in a storage unit (not shown). The signal processing unit 106 may select correction factors corresponding to one or more of the series of calibration points as correction factors for correcting the electrical signal, based on the distance of the target object from the antenna array measured by the distance measuring device 110. For example, the correction factor corresponding to a calibration point whose distance from the target object is less than a certain threshold or is minimum may be selected as the correction factor for correcting the electrical signal. When the correction factors corresponding to a plurality of calibration points are selected, interpolation value(s), e.g. linear interpolation value(s), of the correction factors may be used as the correction factor(s) for correcting the electrical signal.

The calibration point as described above may be an actual calibration point or a "virtual" calibration point. For the so-called actual calibration point, an actual point-like electromagnetic wave source is used, with which the correction factor for the actual calibration point may be obtained through actual measurement. For the so-called virtual calibration point, the actual measurement is not performed, and the correction factor for the virtual calibration point is inferred from e.g. the measurement result of the actual calibration point.

Hereinafter, the correction method will be described in further detail with reference to specific examples.

Figure 2:
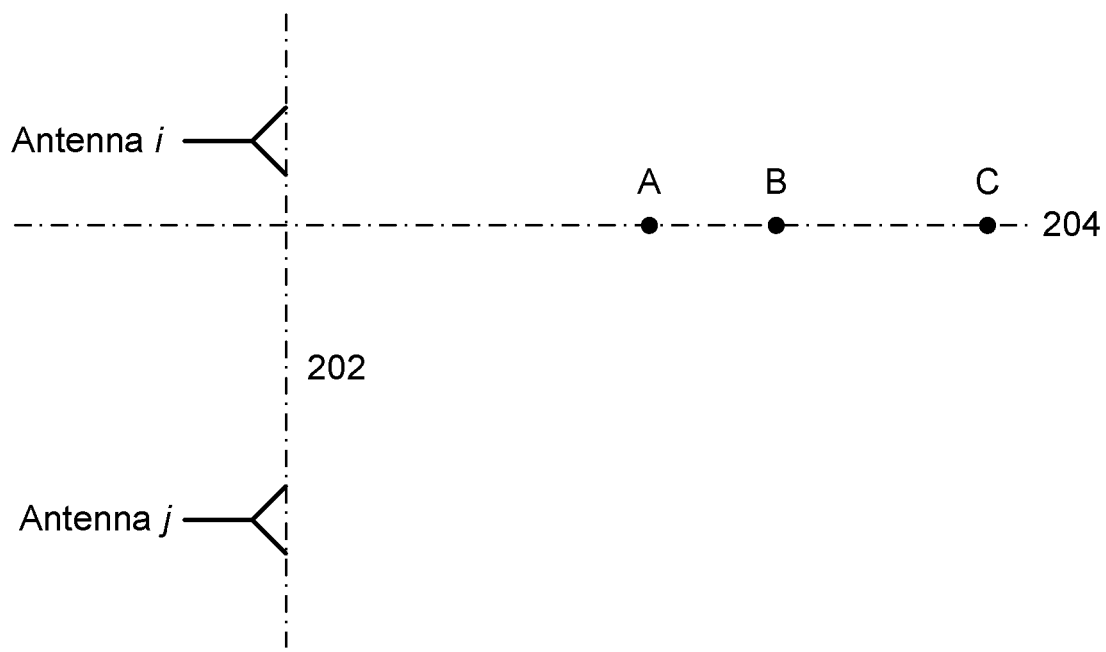
FIG. 2 shows a schematic diagram of determining a correction factor according to an embodiment of the present disclosure.

FIG. 2 shows a schematic diagram of determining a correction factor according to an embodiment of the present disclosure.

As shown in FIG. 2, points A, B and C are any three points on an axis 204 of the antenna array. It should be noted that the so-called "axis" refers to a straight line perpendicular to the antenna plane 202. The axis may pass through any point on the antenna plane, e.g., usually through a center of the antenna array. In general, such an imaging system may obtain a clearer image on the axis and near the axis; and the farther the imaging system is away from the axis, the larger the distortion is. The present application mainly focuses on a scenario where the imaging occurs near the axis, which is a conventional application scenario for such an imaging system. Therefore, only the imaging target points on the axis are shown and considered below. The imaging target point represents the target object near this point on a plane which is perpendicular to the axis and passes this point.

On the determined imaging axis, a point-like electromagnetic wave source is placed at point A (calibration point) which has a predetermined distance from the antenna plane, and the visibility value $V^A_{ij}$ is calculated according to outputs of the i-th antenna in the antenna array and the j-th antenna in the antenna array.

When the target object near point A is being imaged, the visibility value $V_{ij}$ is calculated from the outputs of the i-th antenna in the antenna array and the j-th antenna in the antenna array, let $V'_{ij}=V_{ij}/V^A_{ij}$. The $V'_{ij}$ is substituted into the passive synthetic aperture electromagnetic wave imaging algorithm to obtain a clear image of the target object near point A. Here, $V^A_{ij}$ is referred to as the correction factor of point A. The $V^A_{ij}$ (for every two antennas (i, j) in the antenna array) may be stored in the storage unit.

When the target object is not near point A, e.g., at or near point B, assuming that a difference between a distance of point A from the i-th antenna and a distance of point A from the j-th antenna in the antenna array is $\Delta^A_{ij}$, a difference between a distance of point B from the i-th antenna and a distance of point B from the j-th antenna in the antenna array is $\Delta^B_{ij}$ ($\Delta^A_{ij}$ and $\Delta^B_{ij}$ may be calculated simply by the positions of the two points A and B and the positions of the i-th antenna and the j-th antenna in the antenna array), then the correction factor $V^B_{ij}$ of point B may be calculated by the following formula $$V^B_{ij} = V^A_{ij} * e^{\frac{2\pi J(\Delta^B_{ij}-\Delta^A_{ij})}{\lambda}} * P_{ij} \quad (1)$$

wherein J is a unit of imaginary number, i.e., $J^2=-1$; $\lambda$ is a wavelength of the electromagnetic wave (the wavelength in the use environment; usually the wavelength in the air); and $P_{ij}$ is correction on a signal power, which is a real number, and a specific value thereof may be determined by a specific system (for example, it may be derived from patterns and positions of the respective antennas after the patterns of the respective antennas are fine-measured), or may be ignored, i.e., regarded as 1.

Point B may be an infinity point, where the difference $\Delta^B_{ij}$ between the distance of point B from the i-th antenna and the distance of point B from the j-th antenna in the antenna array is equal to zero.

Let $V'_{ij}=V_{ij}/V^B_{ij}$. A clear image of the target object near point B may be obtained by substituting V'ij into the passive synthetic aperture electromagnetic wave imaging algorithm.

When the target object is further moved to or near point C, a difference $\Delta^C_{ij}$ between a distance of point C from the i-th antenna and a distance of point C from the j-th antenna in the antenna array be calculated based on the distance of the target object and the position of each antenna given by the distance measuring device 106. Then, the correction factor $V^C_{ij}$ of point C may be calculated by the following formula (2):

$$V^C_{ij} = V^A_{ij} * e^{\frac{2\pi J(\Delta^C_{ij}-\Delta^A_{ij})}{\lambda}} * P_{ij} \quad (2)$$

Let $V'_{ij}=V_{ij}/V^C_{ij}$. $V'_{ij}$ is substituted into the passive synthetic aperture electromagnetic wave imaging algorithm to obtain a clear image of the target object near point C.

According to another embodiment of the present disclosure, the correction factor $V^B_{ij}$ calculated according to the formula (1) may be stored in the storage unit as a correction factor for the "virtual" calibration point B (which is not obtained by setting the point-like electromagnetic wave source at point B, but obtained by calculating as described above). When the target object at or near point C is being imaged, the correction factor at the virtual calibration point B may also be used as follows:

$$V^C_{ij} = V^B_{ij} * e^{\frac{2\pi J(\Delta^C_{ij}-\Delta^B_{ij})}{\lambda}} * P_{ij} \quad (3)$$

For each imaging, a new correction factor may be calculated using the latest distance information of the target object given by the distance measuring device 106 (e.g., $V^B_{ij}$ and $V^C_{ij}$ as described above), or $V^C_{ij}$ used in the previous imaging may be used when the distance of the target object does not change significantly.

Thus, a focus of the system may be changed from A to B or C by the correction as described above. When the target object is in a moving state, the focus of the system may be adjusted to or near the target object according to the real-time measurement result of the distance measuring device 110, so that the moving target object may be kept being imaged clearly.

Figure 3:
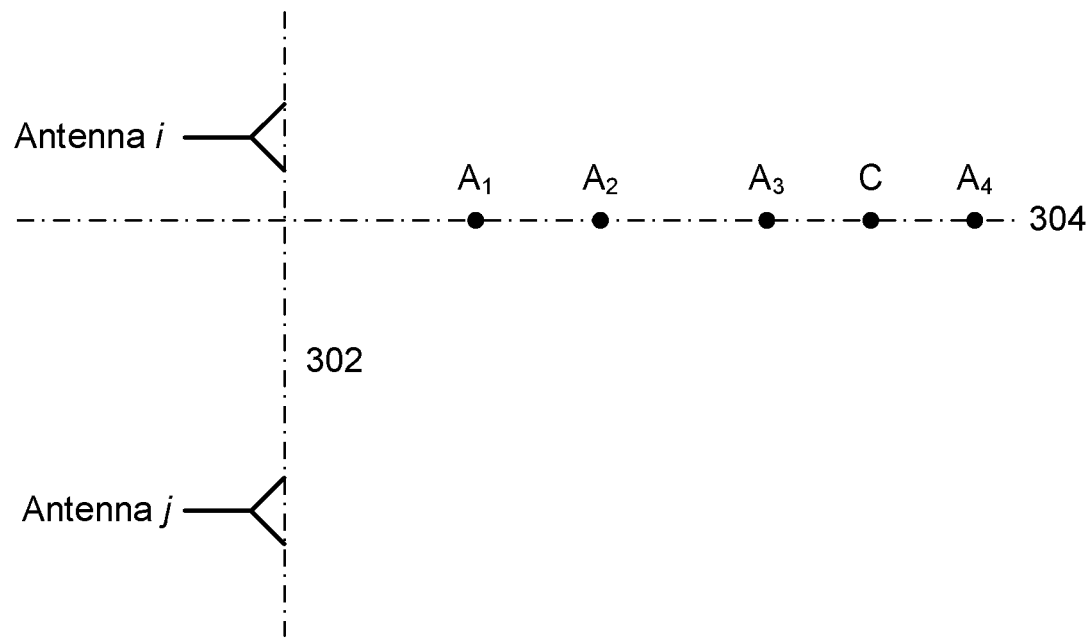
FIG. 3 shows a schematic diagram of determining a correction factor according to another embodiment of the present disclosure.

FIG. 3 shows a schematic diagram of determining a correction factor according to another embodiment of the present disclosure.

As shown in FIG. 3, points $A_k$ (k=1, 2, 3, 4, . . . ) are a series of calibration points on an axis 304 of the antenna array from the near to the distant. The point-like electromagnetic wave sources are placed at points $A_k$, and the visibility value $V^k_{ij}$ is calculated from the outputs of i-th antenna in the antenna array and the j-th antenna in the antenna array. The distances of points $A_k$ from the antenna plane are $d_k$, where $d_k$ (k=1, 2, 3, 4, . . . ) are known. Similarly, it is not necessary to actually measure the respective points $A_k$, where the visibility value $V'^l_{ij}$ at some points $A_l$ may be calculated according to the measurement values at other points (see formula (2) or (3) as described above), i.e., these points are "virtual" calibration points.

When the target object near points $A_k$ is being imaged, the visibility value $V_{ij}$ is calculated according to the outputs of the i-th antenna in the antenna array and the j-th antenna array in the antenna array: let $V'_{ij}=V_{ij}/V^k_{ij}$. $V'_{ij}$ is substituted into the passive synthetic aperture electromagnetic wave imaging algorithm to obtain a clear image of the target object near points $A_k$. Here, $V^k_{ij}$ is referred to as the correction factors of points $A_k$. The $V^k_{ij}$, for all calibration points $A_k$, and every two antennas (i, j) in the antenna array, may be stored in the storage unit.

When the target object is not near points $A_k$, e.g., at or near point C, a calibration points $A_k$ which are closer to the target object (for example, a difference between the distance of the target object from the antenna plane and the distance of the calibration points $A_k$ from the antenna plane are less than a predetermined threshold, wherein a selection criteria for the threshold is use of the correction data at points $A_k$ would not cause the image to be blurred so that the selected calibration points may be more than one) or is closest to the target object may be found according to the distance of the target object from the antenna plane given by the distance measuring device 106, and let $V'_{ij}=V_{ij}/V^k_{ij}$. $V'_{ij}$ is substituted into the passive synthetic aperture electromagnetic wave imaging algorithm to obtain a clear image of the target object near point C.

When there are more than one calibration point being selected, the correction factors $V^k_{ij}$ corresponding to the selected calibration points $A_k$ (k=n, n+1, n+2, . . . , n+m, where specific values of n and m may be determined in practice) may be interpolated, e.g., linearly interpolated, and an interpolation value may be used as the correction factor $V^C_{ij}$ for point C. Let $V'_{ij}=V_{ij}/V^C_{ij}$. $V'_{ij}$ is substituted into the passive synthetic aperture electromagnetic wave imaging algorithm to obtain a clear image of the target object near point C.

The electromagnetic wave imaging system according to the embodiments of the present disclosure has an ability of dynamically adjusting the focal length in real time, and can clearly image the target objects of various distances after the pre-calibration, or perform continuous clear imaging on the moving target object, simplifying use of the electromagnetic wave imaging system and expanding its capabilities.

The embodiments of the present disclosure have been described above. However, these embodiments are for illustrative purposes only, but are not intended to limit the scope of the present disclosure. Although the respective embodiments have been described above separately, it does not mean that the measures in the various embodiments cannot be advantageously used in combination. The scope of the present disclosure is defined by the appended claims and their equivalents. Various alternatives and modifications may be made by the skilled in the art without departing from the scope of the present disclosure, and such alternatives and modifications should fall into the scope of the present disclosure.

We claim:

1. An electromagnetic wave imaging system, comprising:
   an antenna array, configured to receive electromagnetic wave from a target object and convert electromagnetic wave into an electrical signal;
   a signal processing unit, configured to process the electrical signal to obtain an image of the target object; and
   a distance measuring device, configured to measure a distance of the target object from the antenna array, wherein the signal processing unit corrects the electrical signal based at least in part on the measured distance;
   the system further comprising:
   a storage unit, configured to store a correction factor at a calibration point for a visibility value between every two antennas in the antenna array,
   wherein the signal processing unit configured to obtain, for the every two antennas, a correction factor for correcting the electrical signal from the stored correction factors, based on a difference between the distances of the calibration point from the two antennas and a difference between the distances of the target object from the two antennas.

2. The electromagnetic wave imaging system according to claim 1, wherein assuming that for any two antennas i and j in the antenna array, a difference between a distance of the calibration point A from the antenna i and a distance of the calibration point A from the antenna j is $\Delta^A_{ij}$, a difference between a distance of the target object B from the antenna i and a distance of the target object B from the antenna j is $\Delta^B_{ij}$, and the stored correction factor for the antennas i and j is $V^A_{ij}$, the resulting correction factor for the antennas i and j is:

$$V\_ij\hat{\ }B = V\_ij\hat{\ }A * e\hat{\ }(2\pi J(\Delta\_ij\hat{\ }B - \Delta\_ij\hat{\ }A)/\lambda) * P\_ij$$

wherein J is a unit of imaginary number, i.e., $J^2=-1$, $\lambda$ is a wavelength of electromagnetic wave, and $P_{ij}$ is correction on a signal power.

3. The electromagnetic wave imaging system according to claim 2, wherein $P_{ij}=1$.

4. The electromagnetic wave imaging system according to claim 2, wherein the signal processing unit corrects the visibility value $V_{ij}$ of the antennas i and j obtained based on the electric signal from the signal processing unit by a formula: $V'_{ij}=V_{ij}/V^C_{ij}$, where $V^C_{ij}$ is the determined correction factor for correcting the electrical signal, and the corrected visibility value $V'_{ij}$ is used for imaging.

5. An electromagnetic wave imaging system, comprising:
   an antenna array, configured to receive electromagnetic wave from a target object and convert electromagnetic wave into an electrical signal;
   a signal processing unit, configured to process the electrical signal to obtain an image of the target object; and
   a distance measuring device, configured to measure a distance of the target object from the antenna array, wherein the signal processing unit corrects the electrical signal based at least in part on the measured distance;
   a storage unit, configured to store correction factors at a series of calibration points for a visibility value between every two antennas in the antenna array,
   wherein the signal processing unit selects correction factors corresponding to one or more of the series of calibration points as the correction factor for correcting the electrical signal, based on the distance of the target object from the antenna array measured by the distance measuring device.

6. The electromagnetic wave imaging system according to claim 5, wherein the correction factor corresponding to a calibration point whose distance from the target object is less than a certain threshold is selected as the correction factor for correcting the electrical signal.

7. The electromagnetic wave imaging system according to claim 6, wherein a correction factor corresponding to a calibration point whose distance from the target object is minimum is selected as the correction factor for correcting the electrical signal.

8. The electromagnetic wave imaging system according to claim 5, wherein when the correction factors corresponding to a plurality of calibration points are selected, an interpolation value of the correction factors is used as the correction factor for correcting the electrical signal.

9. The electromagnetic wave imaging system according to claim 5, wherein the signal processing unit corrects the visibility value Vij of the antennas i and j obtained based on the electric signal from the signal processing unit by a formula: V'ij=Vij/VCij, where VCij is the determined correction factor for correcting the electrical signal, and the corrected visibility value V'ij is used for imaging.

10. A method of correcting an electrical signal from an antenna array, wherein the antenna array receives electromagnetic wave from a target object, and the received electromagnetic wave is converted into an electrical signal, the method comprising:
measuring a distance of the target object from the antenna array; and
correcting the electrical signal based at least in part on the measured distance
wherein the correcting the electrical signal comprises:
obtaining, for every two antennas in the antenna array, a correction factor for correcting the electrical signal from the correction factor for a visibility value between the two antennas which is obtained in advance by using a calibration point, based on a difference between the distances of the calibration point from the two antennas and a difference between the distances of the target object from the two antennas.

11. The method according to claim 10, wherein assuming that for any two antennas i and j in the antenna array, a difference between a distance of the calibration point A from the antenna i and a distance of the calibration point A from the antenna j is $\Delta^A_{ij}$, a difference between a distance of the target object B from the antenna i and a distance of the target object B from the antenna j is $\Delta^B_{ij}$, and the stored correction factor for the antennas i and j is $V^A_{ij}$, the resulting correction factor for the antennas i and j is:

$$V\_ij\hat{}B = V\_ij\hat{}A * e\hat{}(2\pi J(\Delta\_ij\hat{}B - \Delta\_ij\hat{}A)/\lambda) * P\_ij$$

wherein J is a unit of imaginary number, i.e., $J^2=-1$, $\lambda$ is a wavelength of electromagnetic wave, and $P_{ij}$ is correction on a signal power.

12. The method according to claim 10, wherein the correction factor corresponding to a calibration point whose distance from the target object is less than a certain threshold or is minimum is selected as the correction factor for correcting the electrical signal,
wherein when the correction factors corresponding to a plurality of calibration points are selected, an interpolation value of the correction factors is used as the correction factor for correcting the electrical signal.

13. The method according to claim 10, wherein the visibility value $V_{ij}$ of the antennas i and j obtained based on the electric signal is corrected by a formula: $V'_{ij}=V_{ij}/V^C_{ij}$, where $V^C_{ij}$ is the determined correction factor for correcting the electrical signal.

14. A method of correcting an electrical signal from an antenna array, wherein the antenna array receives electromagnetic wave from a target object, and the received electromagnetic wave is converted into an electrical signal, the method comprising:
obtaining correction factors for a visibility value between every two antennas in the antenna array in advance by using a series of calibration points; and
selecting correction factors corresponding to one or more of the series of calibration points as correction factor for correcting the electrical signal, based on the distance of the target object from the antenna array.

15. The method according to claim 14, wherein the visibility value Vij of the antennas i and j obtained based on the electric signal is corrected by a formula: V'ij=Vij/VCij, where VCij is the determined correction factor for correcting the electrical signal.

* * * * *